Sept. 9, 1930.  W. I. CLEMENTS  1,775,486
GLARE SHIELD, DRAFT REGULATOR, AND ANTIRATTLER FOR AUTOMOBILES
Filed March 17, 1927  2 Sheets-Sheet 1
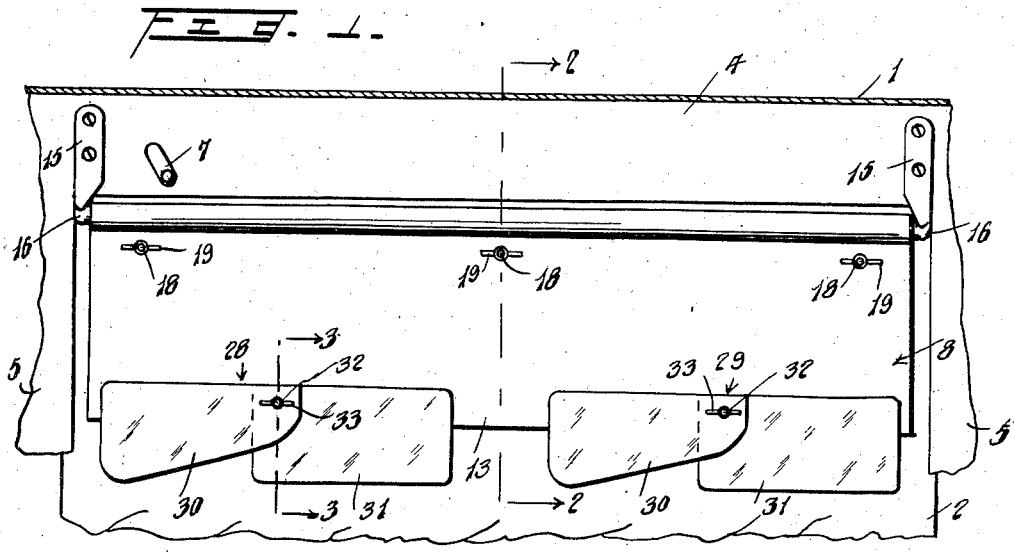
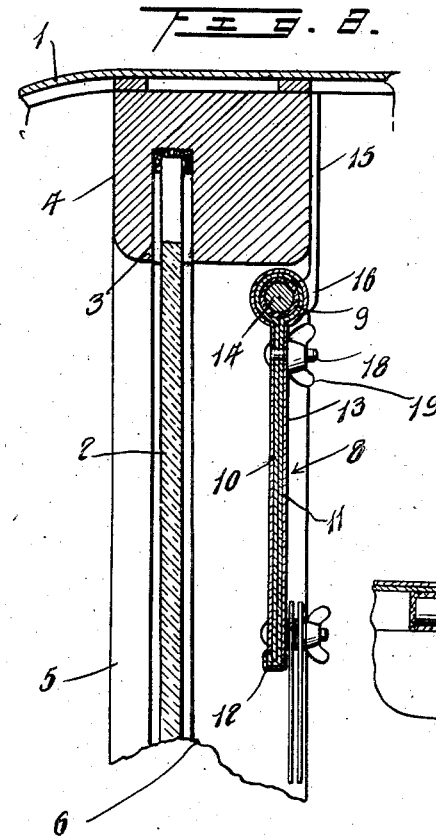
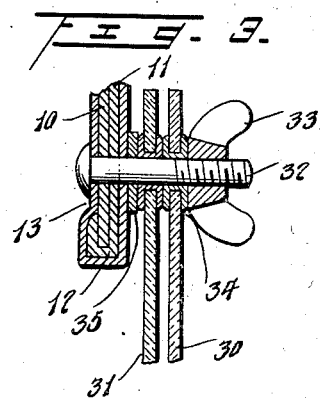
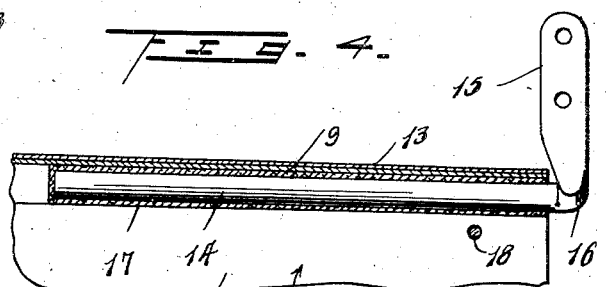
Inventor
W. I. Clements.

Sept. 9, 1930.　　　　W. I. CLEMENTS　　　　1,775,486
GLARE SHIELD, DRAFT REGULATOR, AND ANTIRATTLER FOR AUTOMOBILES
Filed March 17, 1927　　　2 Sheets-Sheet 2
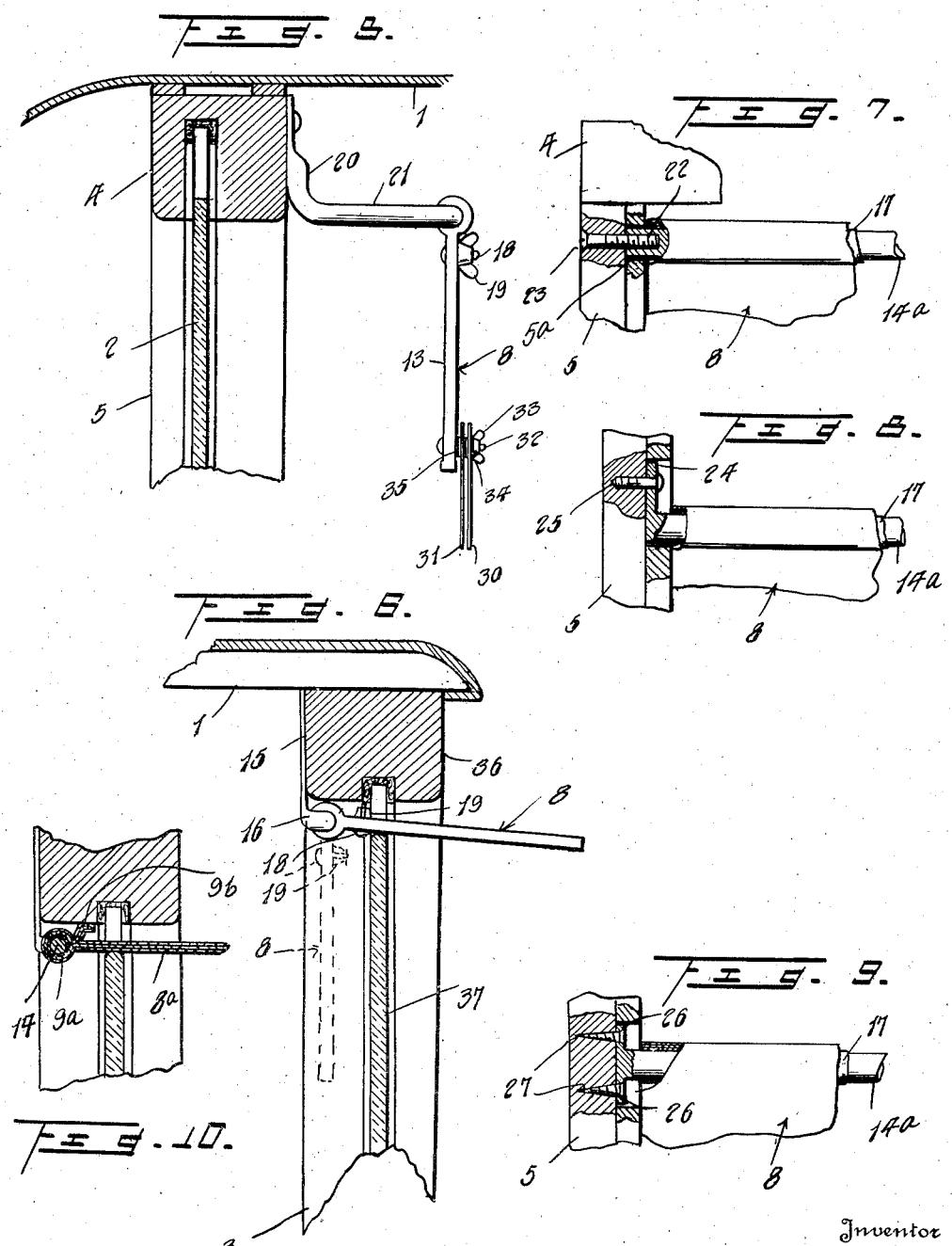
Inventor
W. I. Clements,
By
Attorney Patented Sept. 9, 1930

1,775,486

UNITED STATES PATENT OFFICE

WELLINGTON I. CLEMENTS, OF NORFOLK, VIRGINIA

GLARE SHIELD, DRAFT REGULATOR, AND ANTIRATTLER FOR AUTOMOBILES

Application filed March 17, 1927. Serial No. 176,059.

This invention relates to glare shields for automobiles, and has for one of its objects to provide a novel, simple and inexpensive device of this character which shall be adapted to be supported across the upper portion of a windshield of the vertically sliding type so as to protect the eyes of the driver from road glare and from the blinding rays of street lamps and the headlights of other automobiles.

A further object of the invention is to provide a glare shield of the character stated which shall be mounted for adjustment about a horizontal axis so as to permit it to be moved into the desired or required position.

A still further object of the invention is to provide a glare shield of the character stated which shall also be adapted to be used on the doors of the automobile and which, when so used, is adapted to afford protection from light rays emanating from points at the side of the automobile, is adapted to regulate and control the air entering the automobile when the glass panel of the door is partly lowered, and is adapted to be used to prevent the rattling of the glass panel when the latter is in closed position.

A still further object of the invention is to provide a glare shield of the character stated which shall also be adapted to be used on trains for the purpose of preventing train sickness which is due to the eye strain resulting from watching the ground and objects while the train is in motion.

A still further object of the invention is to provide means through the medium of which the glare shield may be easily and quickly secured in place and through the medium of which it may be easily and quickly adjusted and secured in adjusted position.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 is a view partly in rear elevation and partly in vertical section illustrating the application of the glare shield to an automobile in rear of the windshield, Figure 2 is a sectional view taken on the vertical plane indicated by the line 2—2 of Figure 1, Figure 3 is a sectional view taken on the vertical plane indicated by the line 3—3 of Figure 1, Figure 4 is a view partly in elevation and partly in vertical section illustrating the manner in which the glare shield is connected to its supporting means, Figure 5 is a view similar to Figure 2 illustrating a slight modified form of the glare shield supporting means, Figure 6 is a sectional view illustrating the application of the glare shield to the door of the automobile, Figures 7, 8 and 9 are views partly in elevation and partly in section illustrating further modified forms of the glare shield supporting means, and Figure 10 is a view similar to Figure 6 illustrating a modified form of the panel.

Referring in detail to the drawings, in the several views of which corresponding parts are designated by like reference characters, 1 designates the top and 2 the windshield of an automobile. The windshield 2 is of the vertically sliding type, and the upper edge thereof occupies a groove 3 in the top cross bar 4 of the automobile. This bar is located at the front of the automobile, the top 1 rests thereon, and it is supported by the side posts 5 which are provided with vertical grooves 6 for the reception of the side edges of the windshield 2. The windshield 2 is raised and lowered through the medium of means which includes a hand crank 7 mounted on the cross bar 4.

The glare shield comprises a panel 8 which is suspended from the cross bar 4 in rear of the upper portion of the windshield and which extends from one of the side posts 5 to the other. The panel 8 which is opaque and of elongated rectangular contour, is made from a blank of light sheet metal. The blank is bent to provide a split tube 9 and front and rear plies 10 and 11, respectively.

The tube 9 is located at the upper edge of the panel 8, and the side and bottom edges of one of the plies 10 and 11 are bent, as shown at 12, into engagement with the corresponding edges of the other ply so as to hold the parts against relative movement. The panel 8 is provided with a cover 13 which may be of any suitable material and which preferably matches the trim of the automobile. If desired the cover 13 may be omitted and the panel 8 painted the desired color.

The panel 8 is suspended from the cross bar 4 by a pivot which may consist of shafts 14 which are positioned directly beneath the cross bar and arranged within the tube 9 of the panel. The shafts 14 are carried by brackets which comprise vertical members 15 secured to the rear side of the cross bar 4 and forwardly extending horizontal members 16 positioned beneath the cross bar and carrying the shafts. Friction sleeves 17 of canvas or any other suitable material are arranged within the tube 9 upon the shafts 14. The normal internal diameter of the tube 9 is slightly less than the external diameter of the friction sleeves 17, and due thereto there is sufficient friction between the tube and sleeves to prevent the casual turning movement and rattling of the panel 8. Any wear that may occur in the friction sleeves 17, may be compensated for by compressing the tube 9, and this may be done through the medium of bolts 18 and winged nuts 19 which are carried by the panel 8 immediately below the tube. When this manner of suspending the panel 8 from the cross bar 4 is impracticable by reason of the mounting of a windshield operating motor upon the cross bar, the panel may be suspended in the manner shown in Figure 5. As shown in this figure, the panel 8 is positioned rearwardly beyond the cross bar 4, and is suspended from the cross bar by brackets which comprise vertical members 20 and horizontal members 21. The vertical members 20 are secured to the rear side of the cross bar 4, and the horizontal members 21, which carry the shafts 14, extend rearwardly from the lower ends of the members 20.

If desired, the pivot for the panel 8 may consist of a single shaft 14$^a$ which may be secured to the cross bar 4 by brackets of the type shown in Figures 1, 2 and 4 or of the type shown in Figure 5. This shaft may also be secured to the side posts 5 with its ends positioned in recesses 5$^a$, as shown in Figures 7, 8 and 9. The shaft may be provided in its ends with threaded notches 22 for the reception of machine screws 23 passing through the side posts 5. If desired, the shaft may be provided at its ends with upstanding lugs 24 apertured for the reception of retaining screws 25, or the ends of the shaft may be provided with upwardly and downwardly extending lugs 26 for the reception of retaining screws 27.

As the panel 8 extends across the upper portion of the windshield 2, or in other words, as it extends across the upper portion of the windshield receiving opening of the automobile, it will protect the driver from road glare and from the blinding rays of street lamps and the headlights of approaching automobiles. It may be adjusted into a vertical position or into a forwardly or rearwardly inclined position, and due thereto it is adapted to be used by drivers of different size. To adjust the shield 8, it is only necessary to grasp it and move it into the desired position.

To afford the maximum protection against the blinding rays of the headlights of approaching automobiles, shields 28 and 29 are secured to the panel 8. The shield 28 being adapted to protect the eyes of the driver and the shield 29 the eyes of the other occupant of the front seat of the automobile. The shields 28 and 29 are similar and each comprises panels 30 and 31 which are colored and made of celluloid or other suitable material. The translucent panel 30 is of triangular contour, and the translucent panel 31 is of elongated rectangular contour. The panels 30 and 31 are secured to the panel 8 adjacent the lower edge of the latter by a bolt 32 and winged nut 33. The inner ends of the panels 30 and 31 are arranged in overlapping relation and are provided with eyelets 34 through which the bolt 32 passes. A washer 35 is positioned on the bolt 32 between one of the eyelets 34 and the panel 8, and said washer and the front and rear sides of the eyelets are slightly roughened so as to hold the panels 30 and 31 against casual pivotal movement when the winged nut 33 is tightened. The panels 30 and 31 are adapted to be adjusted with respect to the panel 8 to position their lower edges at the required distance below the corresponding edge of the panel 8 or adjusted so as to position them wholly above said edge of the panel 8, the inclined edge of the panel 30 extending downwardly and outwardly when the panels are in position for use.

In Figure 6, the shield is shown applied to a window of the automobile, 36 designating the top and 37 the vertically sliding glass panel of the window. The shield is secured to the inner side of the window, and the panel 8 thereof is adapted to be arranged in a vertical position, as indicated by dotted lines, or in an inwardly or outwardly inclined position. When in either of these positions, the panel 8 affords protection against light rays and prevents air from blowing directly on the occupants of the automobile when the panel 37 is partly lowered. The panel 8 is also adapted to be swung through the window, as shown by solid lines, and when in this position with the upper edge of the panel 37 contacting with the under side thereof, it functions to prevent the rattling of the panel. In this or the other application of the shield, the panel 8 may be adjusted into a horizontal position when it is not desired to use the same.

As shown in Figure 10, the panel, which is here designated 8ª, may be made from a sheet of relatively stiff metal in order to obviate the necessity of providing it with front and rear plies to give it the desired rigidity. The upper edge of the panel 8ª is rolled to provide a split tube 9ª for the reception of the supporting shaft or shafts, and the free edge of this tube is provided with a flange 9ᵇ which when the panel is in the position shown contacts with the top 36 of the door and prevents air entering the car.

The device may be also used to prevent train sickness, and when so used is mounted to position the panel 8 thereof across the lower portion of the window of a car, so as to prevent bushes and the ground adjacent the road bed from being seen from the window, it being well known that the constant watching of bushes and ground near the road bed produces eye strain which in turn results in what is known as train sickness.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A glare shield comprising a pivot, a friction sleeve of inherently compressible fabric material mounted on the pivot, and a panel comprising a sheet having a split tube and panel portions extending from the edges of the tube, said tube receiving the friction sleeve and pivot, the normal inside diameter of the tube being less than the diameter of the sleeve as initially applied so as to hold the panel against casual movement with respect to the pivot, and means to clamp the panel portions together and said tube and sleeve about the pivot as a result.

2. A glare shield comprising a pivot, a friction sleeve of compressible material mounted on the pivot, a panel having a split tube of U-shape receiving the friction sleeve and pivot, the normal inside diameter of the tube being less than the external diameter of the sleeve as initially applied so as to hold the panel against casual movement with respect to the pivot, panel portions extending from the free edges of the tube, and means mounted by said portions operable to move the portions into operative position and thereby contract the tube and sleeve.

In testimony whereof I affix my signature.

WELLINGTON I. CLEMENTS.